United States Patent
Li et al.

(10) Patent No.: US 9,633,082 B2
(45) Date of Patent: Apr. 25, 2017

(54) SEARCH RESULT RANKING METHOD AND SYSTEM

(71) Applicant: Alibaba Group Holding Limited, George Town, KY (US)

(72) Inventors: Jiasen Li, Hangzhou (CN); Suisui Su, Hangzhou (CN)

(73) Assignee: Alibaba Group Holding Limited (KY)

( * ) Notice: Subject to any disclaimer, the term of this patent is extended or adjusted under 35 U.S.C. 154(b) by 401 days.

(21) Appl. No.: 14/062,773

(22) Filed: Oct. 24, 2013

(65) Prior Publication Data

US 2014/0122475 A1 May 1, 2014

(30) Foreign Application Priority Data

Oct. 29, 2012 (CN) .......................... 2012 1 0420861

(51) Int. Cl.
*G06F 17/30* (2006.01)
*G06F 7/00* (2006.01)

(52) U.S. Cl.
CPC .... *G06F 17/3053* (2013.01); *G06F 17/30648* (2013.01)

(58) Field of Classification Search
None
See application file for complete search history.

(56) References Cited

U.S. PATENT DOCUMENTS

| | | | |
|---|---|---|---|
| 8,117,197 B1 | 2/2012 | Cramer | |
| 8,352,467 B1 | 1/2013 | Guha | |
| 8,359,309 B1 | 1/2013 | Provine et al. | |
| 8,510,298 B2 | 8/2013 | Khandelwal | |
| 2005/0203918 A1* | 9/2005 | Holbrook | G06F 17/30696 |
| 2007/0260597 A1* | 11/2007 | Cramer | G06F 17/30867 |
| 2009/0144259 A1 | 6/2009 | Sundaresan | |
| 2010/0262495 A1* | 10/2010 | Dumon | G06F 17/30979 705/14.54 |
| 2012/0084283 A1 | 4/2012 | Chitiveli et al. | |

\* cited by examiner

*Primary Examiner* — Usmaan Saeed
*Assistant Examiner* — Yu Zhao
(74) *Attorney, Agent, or Firm* — Van Pelt, Yi & James LLP

(57) ABSTRACT

Search result ranking includes recording user action information on displayed objects in search results obtained using one or more query words, upon receiving a switch-page request or switch-screen request, determining a commonality level of one or more attribute characteristics in a set of objects subjected to user actions, the determining of the commonality level being based on the user action information on the displayed objects, selecting attribute characteristics that comply with predetermined requirements to serve as reference norms for ranking objects that are to be displayed or ranked, the selecting of the attribute characteristics being based on the commonality level, and adjusting rank of objects that are to be displayed or to be ranked and whose attribute characteristics comply with the reference norms.

21 Claims, 7 Drawing Sheets

100

200

300

500

SEARCH RESULT RANKING METHOD AND SYSTEM

CROSS REFERENCE TO OTHER APPLICATIONS

This application claims priority to People's Republic of China Patent Application No. 201210420861.6 entitled SEARCH RESULT RANKING METHOD AND DEVICE, filed Oct. 29, 2012 which is incorporated herein by reference for all purposes.

FIELD OF THE INVENTION

The present application relates to a search result ranking method and system.

BACKGROUND OF THE INVENTION

As computer networking technology continues to develop, e-commerce websites are setting up their own search engine to provide product search services to help users to look for products and quickly find products of interest. Product search methods are similar to search methods used by ordinary search engines (such as Baidu, Google, and Bing), but the product search methods have their own characteristics. In typical searches, correlation with query words is considered when ranking search results. However, product searches obtain search results through comprehensive rankings that include a plurality of dimensions, such as historical buyer evaluations of products, reputations of the sellers that publish product information, difficulty or ease with which fraud can be committed, correlation of categories, product prices, as well as user personal preference data on various product objects.

Conventionally, search results typically are displayed in the form of separate pages or cascades, with a predefined quantity of products being displayed on one page or one screen, for example, 40 products on each page. Subsequently, the user can choose to switch to the next page or screen for browsing. With the page-by-page display form, whenever the user turns the page, the user sends another request to the search engine by clicking the corresponding page number or the tab to switch to the next page. The user then browses products on other pages. With the cascade display form, another request is sent to the search engine when the cursor or slider is dragged down, and more web page content is displayed in place of the former content.

Because the search results at the present time are single-output, natural search results, no re-ranking occurs when switching to search results on a different page. A display sequence of the search results is not related to user click or browsing actions. For example, if a user enters the query word "Nike" when conducting a product search and the user clicks on 10 products on the first page of the corresponding search results, when the user switches to the second page of the search results, the search results displayed on the second page are unrelated to the search results that were or were not clicked on the first page of the search results. In other words, no dynamic ranking occurs based on the user actions.

In ordinary search engines, results of the first click action refer to natural search results from query words to be used as a target web page. The natural search results are then adjusted from low to high based on the distance from the target web page (in other words, based on a similarity between total web pages and the target web page). This clarifies the intention of the user's query instead of having multiple terms for a single meaning and multiple meanings for a single term.

Similarity distance calculations between ordinary search pages are not necessarily suitable for product searches because the information (such as title, price, and picture information) displayed on page listings of the natural results of the product searches is compounded with target page product descriptions, evaluation information, retail shop information, transaction records, sales promotion information, attribute information, and various other kinds of information. For example, an "ordinary" search page is a comparison of the similarities between pages. A comparison of product similarities relate to the content of the product itself, and similarities of product information between pages are not important. Because a product information page includes user's feedback of the product, other information recommended by the product seller, etc., similar products have different content in these areas of product information pages. Even if two products are similar, the product information pages can be very different. Thus, "ordinary" search pages comparisons are not suitable. In addition, the target page information is already unable to represent information on user-clicked natural search results. The target page information may include product feedback from the users, seller information, seller's recommendation information, seller's description of the products, etc. Different sellers selling the same product can have different descriptions, and different users' feedback for products from different sellers can be different. Differences in product recommendation information can exist. Thus, all of the information is difficult to use for determining similarities in products. As such, the target page information does not necessarily reflect information about the product itself, and would be difficult to reflect the user's intent when clicked. Therefore, the similarity between the target web page and the web pages of objects cannot truly represent the similarity to product search results. In addition, dynamic rankings of ordinary search results typically consist of optimizing natural results from query words. The initial search results are used to probe the intentions of the query words. The initial search results may differ considerably from the user's actual intentions. Accordingly, accuracy and user browsing-to-transaction conversion rates of the initial search results are relatively low.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, the search result ranking method and system provided are implemented on various kinds of search engines. The search result ranking method and system relate to situations, such as, product searches of an e-commerce website and other situations, in which many categories of attribute information for the search results that are obtained exist. Product searches are used as examples in the present application, and an explanation is to be provided of the process whereby the dynamic ranking of product search results is handled.

Figure 1:
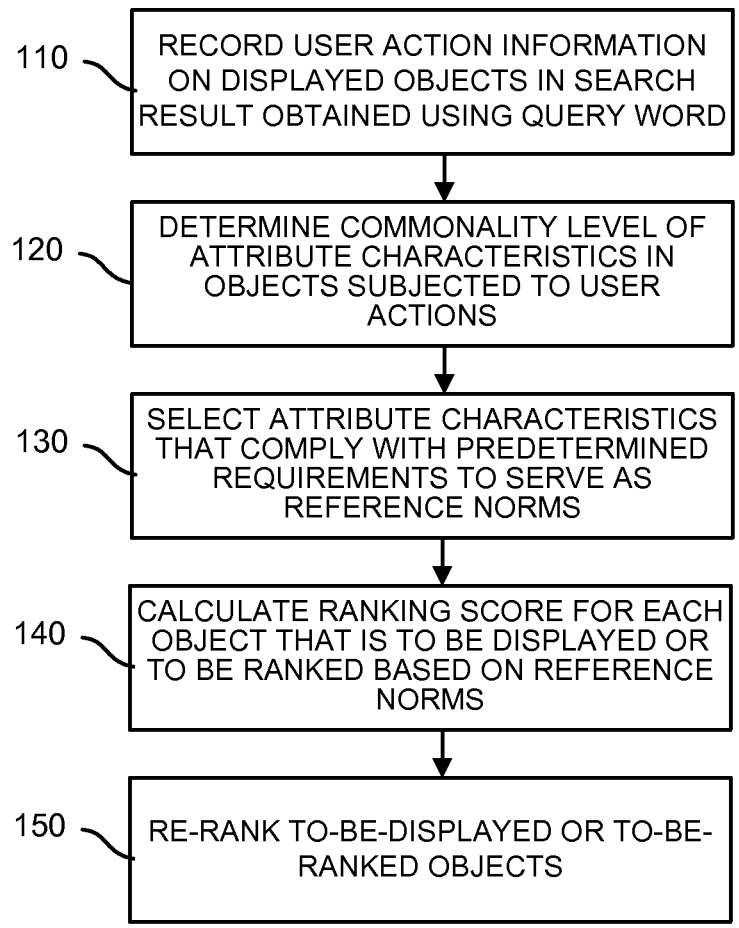
FIG. 1 is a flowchart of an embodiment of a search result ranking method.

FIG. 1 is a flowchart of an embodiment of a search result ranking method. In some embodiments, the method 100 is implemented by the server 530 of FIG. 5 and comprises:

In 110, the server records user action information on displayed objects in search results obtained using one or more query words.

After entering the query words through a browser and confirming the query words, a user sends a search request to a search engine. In some embodiments, the server includes the search engine. After receiving the search request of the user, the search engine performs words segmentation and other such operations on the query words and conducts a search to obtain a corresponding search result. The server displays the search result in page-by-page or screen-by-screen form based on the magnitude of correlation between the query words and objects to be displayed. In some embodiments, a currently existing search engine is used to obtain the search results for the query words, and a default ranking method is used for displaying the obtained search results.

In various embodiments, the objects are products and/or product information. During product searches, query words are used to search databases to find products that are related to the query words. The found products are then ranked and displayed according to the magnitude of correlation between the query words and products to be displayed. In some embodiments, another form of product ranking is adopted. No restriction is imposed on the specific form of display.

User actions relating to the displayed objects in the search results include browsing and clicking. The browsing, clicking, or other such user actions are used as a basis for recording the action information on each object in the search results. In some embodiments, the action information includes: objects of user action, information on the relative positions of the objects of the user action in search results, the sequences in which the user browsed or clicked the action objects, or any combination thereof. The product searches are used as illustrative examples. In some embodiments, an object within the search results is, in concrete terms, a product. Objects that have not been displayed in the search results are objects that are to be re-ranked and displayed.

The recording of the action information on user-browsed pages is based on user browsing actions. Regardless of whether the page has generated click information, the user browsing action is recorded a long as the user has browsed the page. The recorded information, i.e., the user action information, further includes page session information, the query words corresponding to the page, the page number or screen of the page within the search results, the product identifier (ID) corresponding to the page, the action sequence for the object of the current user action within the objects acted upon by the user, etc.

A session refers to the process during which the terminal user and the interactive system communicate. The session typically refers to the process beginning with the user logging in and entering the system and ending with the user logging out and exiting the system.

As an example, one session refers to the following: when a user is browsing a website, the operations of the user while the user is using the browser during a time period defined as beginning with the user's logging into the website and ending with the user's logging out or closing the browser constitute the operations of the same session.

During a session, the user enters one or more query words to conduct search queries. Search results from the same query word or query word combinations within the same session are dynamically ranked. The search results on page n+1 are ranked based on the browsing or clicking feedback from the previous n pages. In some embodiments, in meeting actual use desires, the search results for the same query word in different sessions within a period of time are dynamically ranked, as for example, for the same user or the same IP address.

By the same principle, recording clicked products are based on user click actions. The clicked products are recorded together with the sequence in which products are clicked, i.e., the sequence of actions of the user with respect to the objects. The action information recorded with respect to user-clicked objects includes page session information corresponding to the objects, query words corresponding to the objects, the page number or screen of the page where the objects are located among the search results, the product identifier (ID) of the objects, the sequence in which the objects were clicked among all the objects subjected to user action, or any combination thereof. In some embodiments, the recorded format is, for example, "(session, query words, page number, product ID string, action sequence)," expressing information on the product IDs clicked on one page for a certain query word in one session. Statistics have revealed that, during a query search, the click that is closest to the user's intention is not the first click but the last click.

Typically, the closer a click is to the end of a click sequence, the greater is click's value and the better the click matches the user's query intention.

In some embodiments, for a storage format, clicked products are written in sequence into a product ID string and then compressed with a fixed symbol. In some embodiments, a "storehouse" data structure is used. As an aspect, other data structures are used as well.

As an example, assume that "Nike" is searched. On the first page, four products are clicked in sequence. Typically, the number of products on a page is 40. Thus, the recording results are:

(20120324081, nike, 1, auction_1:auction_3:auction_5: auction_15)

The first field the recording results represents a session. For example, "20120324081" corresponds to the ID of a session. The second field corresponds to the query word, and the third field corresponds to the page. "auction_1," "auction_3," "auction_5," and "auction_15" each represent the ID of a different product. The recording results of the above example reveal the search results of the first page. The product with the product ID of "auction_15" is the fourth product clicked.

In 120, upon receiving a switch-page or switch-screen request, the server determines a commonality level of one or more attribute characteristics in objects subjected to user actions. In some embodiments, the determining of the commonality level is based on the user action information on the displayed objects.

In some embodiments, when the user sends a switch page request, the search engine has already displayed a portion of the search results. For example, when the user jumps from page 2 to page 3, the first and second pages of the search results include already displayed search result. The user can selectively perform actions to the displayed portion of the search result (for example, click on a product). In other words, by clicking on a product, the user is more interested in clicked products than unclicked products.

When searching for a product, the server can determine rates of appearance of attribute characteristics in displayed and clicked products. For example, in the already displayed and clicked products, the rate of appearance of an attribute characteristic corresponds to the rate of the products having the attribute characteristic. The higher a rate of appearance of an attribute characteristic, the greater the commonality of the attribute characteristic in the user's already clicked products.

The commonality level indicates the probability that the attribute characteristic is a common attribute characteristic of the clicked products, and is used to indicate the probability that the likelihood that the product the user is interested in should have this attribute characteristic.

During the same session, when the user sends the switch-page or switch-screen request with respect to a search result list for the same query word, the search engine acquires the user action information on the displayed objects of the search results corresponding to the query word used in the current session and determines characteristic information on the objects subjected to user actions.

Figure 2:
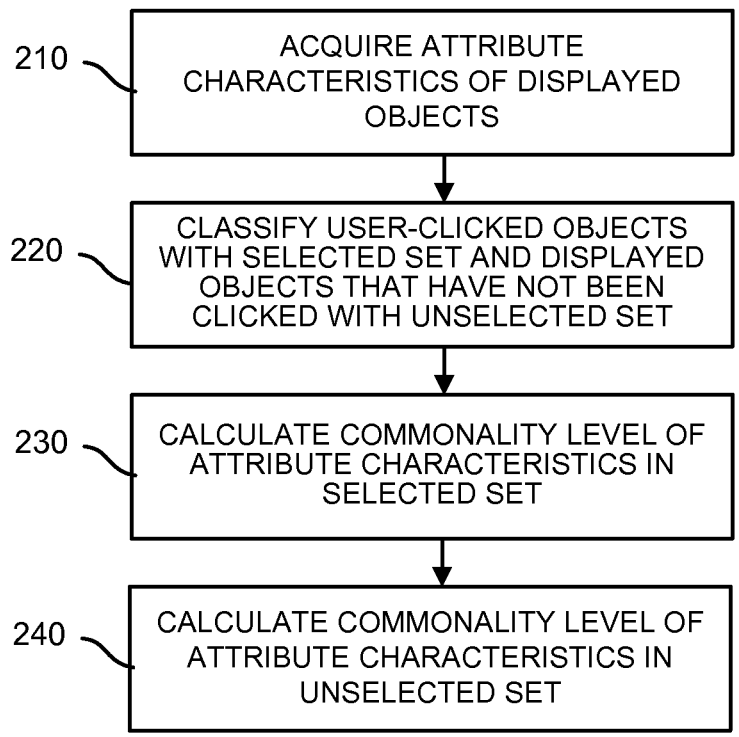
FIG. 2 is a flowchart of an embodiment of an attribute characteristic commonality level determining method.

FIG. 2 is a flowchart of an embodiment of an attribute characteristic commonality level determining method. In some embodiments, the method 200 is an implementation of 120 of FIG. 1 and comprises:

In 210, the server acquires attribute characteristics of the displayed objects.

The product IDs corresponding to the user action objects are collected in order of relational sequence in historical selection information, and each attribute characteristic corresponding to the product IDs is acquired. The relational sequence refers to the order of the user's action with respect to displayed results (for example, the user's click order of the products). For example, the products that are clicked include Product-1, Product-3, and Product-9, in which the numbers displayed correspond to the order of the products in the result list. Product-1 is the first product in the result list. The user may first click Product-3, then Product-9, and then Product-1. Thus, the user's relational sequence corresponds to the user's historical selection information, which can be recorded as (Product-3 : Product-9 : Product-1). Attribute characteristics include: the title of the product information, the price of the product, picture or picture address of the product, the number of recent transactions, shipping costs, area where the product is located, seller's name, self-defined tags (for example, service tags provided by the product publisher, including: "Triple refund for one fake," "As described," "Goods refunded or replaced for 7 days, no explanation required," "Shipped with lightning speed," "Detailed drawings," "Payment upon delivery," "Consumer safeguards," and other product or seller tags), or any combination thereof. In some embodiments, because the attribute characteristics of the products typically are displayed on search result list pages, affecting action tendencies of the buyer in relation to the search results via direct and intuitive appeal is possible. Therefore, in some embodiments, the attribute characteristics of the product are used to identify user intentions. In some embodiments, the attribute characteristics include attribute values or attribute value intervals of attributes and of products in relation to the attributes.

In 220, the server classifies user-clicked objects with a selected set and displayed objects that have not been clicked with an unselected set.

A user click or other selection action (for example, a voice based selection action) can include one or more user actions. In some embodiments, a user click is included in the following user actions: The user selects an object among search results, clicks the selected object, and goes to a detailed information page for the selected clicked object. In some embodiments, the user click is also included in the following user action: the user selects an object among search results such that detailed descriptive information of the object is displayed.

When the user selects a list page of search results, objects displayed on the list page are typically objects that the user can acquire or browse. After the user selects and obtains the list page, the objects displayed on the list page are regarded as objects already browsed by the reader.

The browsed products (i.e., displayed objects) are divided into two sets: the selected set and the unselected set. The products in the selected set are products that have been browsed and clicked. The products in the unselected set are products that have been browsed but not clicked.

Please note that, in some embodiments, the order of 210 and 220 of FIG. 2 are reversed.

In 230, the server calculates the commonality level of each attribute characteristic in the selected set based on attribute characteristics possessed by the objects in the selected set.

In 240, the server calculates the commonality level of each attribute characteristic in the unselected set based on attribute characteristics possessed by the objects in the unselected set.

As used herein the commonality level of an attribute characteristic in the selected set or the unselected set refers to the ratio of the number of objects having the same or similar attribute characteristic to the total number of objects in the selected set or the unselected set. In other words, the commonality level of the attribute characteristic corresponds to the ratio of number of products which have same or similar attribute values to the total number of objects in the selected set or the unselected set.

A situation where the attribute values of the attribute are similar includes the attribute values of the attribute of a plurality of objects are within the same preset interval.

As an example, pictures are one factor that influences clicking, yet having a similar commonality level for each picture of a similar product is very difficult or unlikely. Additionally, in product searches, products' pictures are unlikely to be the same or similar. Thus, determining whether products are the same or similar based on a determination whether corresponding products pictures are identical or similar is difficult. When performing product picture comparisons, values of product pictures are translated into product picture characteristic values (for example, average gray scale values) for computing the similarities of the product pictures. When the product picture characteristic values are within a certain threshold, the product pictures are determined to have a similar commonality level. Therefore, in some embodiments, the attribute characteristics are divided into graphic attribute characteristics and non-graphic attribute characteristics. In some embodiments, the attribute values of picture attributes are expressed using product picture characteristic values. For example, the values of picture attributes include a picture's average gray scale value, a texture value, etc.

To calculate commonality levels of the non-graphic attribute characteristics, the attribute values of the non-graphic attribute characteristics of the products are digitized or split into groups and discretized. For example, a statistical method is used to group price, number of transactions, credit, and other attributes according to certain rules. For example, a price attribute is divided into the three attribute value ranges of (0, 50], (50, 100] and (100-150], and attribute value of the price attribute of each product is assigned to an appropriate range. By grouping each attribute of the products, grouping and discretizing the attribute characteristics is possible. In the event that a majority of clicked products falls into the same attribute value range for a certain attribute, the attribute and the attribute values of the attribute will have a higher commonality level among the clicked products with respect to the attribute characteristic that is formed.

Referring back to FIG. 1, in 130, the server selects attribute characteristics that comply with predetermined requirements to serve as reference norms for ranking objects that are to be displayed or ranked. In some embodiments, the selecting of the attribute characteristics is based on the commonality level.

In some embodiments, the server selects attribute characteristics that comply (e.g., meet predetermined requirements) to serve as reference norms for ranking objects that are to be displayed or ranked (i.e., undisplayed objects) based on one or more of the following approaches. For example, when the user switches from page 2 to page 3, the objects on page 3 are to be displayed, the objects on page 3 and after are to be ordered. In this example, the objects on page 3 and after are re-ordered, and the newly ordered results are used to determine the content displayed in page 3.

In a first approach, the server ranks the various attribute characteristics in order of highest to lowest commonality level, and selects a pre-established quantity of top-ranked attribute characteristics to serve as reference norms.

In a second approach, the server selects attribute characteristics whose commonality level is greater than a preset threshold value as reference norms.

In a third approach, the server first calculates differences between commonality levels of each attribute characteristic in the selected set and the unselected set, and regards the attribute characteristics corresponding to the differences in commonality levels that are greater than a predetermined threshold value as reference norms.

In a fourth approach, the server first calculates differences between commonality levels of each attribute characteristic in the selected set and the unselected set, ranks the attribute characteristics from high to low based on the differences in commonality levels, and selects a preset quantity of top-ranked attribute characteristics as reference norms.

In the event that one or more attribute characteristics have higher commonality levels in the selected set, i.e., the attribute characteristics in the set of products clicked by the user have higher commonality levels, having a higher commonality level means that the attribute characteristics are possibly reference factors in the user's choice of products. In some embodiments, reference norms include one or more attribute characteristics. The reference norms are factors used by the user for selecting products. At the same time, the lower the commonality level of the attribute characteristics in the unselected set, then the greater the difference in commonality levels of the attribute characteristics in the selected set and the unselected set is. Having higher commonality levels indicates a higher probability that those attribute characteristics influenced the users' product selection, in which case the attribute characteristics are regarded as reference norms for dynamic ranking of the products on un-displayed pages. In some embodiments, reference norms are used to differentiate user intentions.

In some embodiments, the dynamic ranking takes the differences in commonality levels of attribute characteristics in the selected set and the unselected set into consideration and selects as reference norms attribute characteristics that have high commonality levels in the selected set but that either do not exist in the unselected set or have low commonality levels in the unselected set.

In some embodiments, 220 of FIG. 2 is omitted. In some embodiments, the unselected set is not to be considered when there are relatively few user clicks, for example, when just one or two products have been clicked. Accordingly, in some embodiments, in 210 of FIG. 2, the server sequentially acquires attributes and the attribute values of the attributes for clicked objects and does so based on nothing more than the click sequence for the objects.

In 140, the server calculates a ranking score for each object that is to be displayed or to be ranked based on a corresponding reference norm.

In some embodiments, the server determines reference norms based on commonality levels. For example, the set of reference norms determined based on a commonality level of each attribute characteristic in the selected set is expressed as (A1, A2, A3). The set of reference norms determined based on a commonality level of each attribute characteristic in the unselected set is expressed as (B1, B2, B3). In some embodiments, any number of references norms can be selected for the selected and the unselected sets. For example, 4 references norms are selected for each of the selected and unselected sets. In some embodiments, the attribute characteristics satisfy the requirements (e.g., are greater than thresholds) to be reference norms. There can be one or more references norms, and one is not just limited to 3 reference norms.

For objects to be ranked, the server performs ranking score adjustments based on the reference norms. The ranking score adjustments increase the ranking scores of objects that comply with the reference norms A1,A2, A3, or any combination thereof, and decrease the ranking scores of objects that comply with the reference norms B1,B2,B3, or any combination thereof. In other words, the ranking score adjustments increase the ranking scores of, or give positive ranking scores to, objects that have not been displayed or are to be ranked and which comply with the reference norms determined from the selected set, and decrease the ranking scores of, or give negative ranking scores to, objects that have not been displayed or are to be ranked and which comply with the reference norms determined from the unselected set. In some embodiments, the case that an object complies with the reference norms relates to the object having attribute characteristics that are the same as the reference norms. In some embodiments, the case that an object complies with the reference norms relates to a difference between the values of the object's attribute characteristics and the reference norms falling within a predetermined range.

In some embodiments, the calculation of the ranking score of each object that is to be displayed or ranked also considers the ranking score of each object as obtained by natural ranking rules. In other words, the ranking score of each object that is obtained in accordance with the natural ranking rules is increased or decreased based on the reference norms. In some embodiments, the natural ranking rules are the ranking rules used when the first page or first screen of the search results list is displayed.

When calculating the ranking score of each object that has not been displayed or that is to be ranked, in order to ensure preferential display of objects that comply with reference norms determined from the selected set, the ranking score of objects that have not been displayed or that are to be ranked and that comply with reference norms determined from the selected set can be scores which were originally the maximum ranking scores of not-yet-displayed or to-be-ranked objects that were obtained in accordance with natural ranking rules and which were then boosted. Examples of natural ranking rules include the relatedness of a search target and a keyword (for example, appearance rate of the keyword in the search target), search target's click rate, etc. In some embodiments, the natural ranking rules relates to rankings from a natural search. The natural ranking rules may relate to the rules ranking the objects in a first page or a first screen in the present search of the user.

Figure 3:
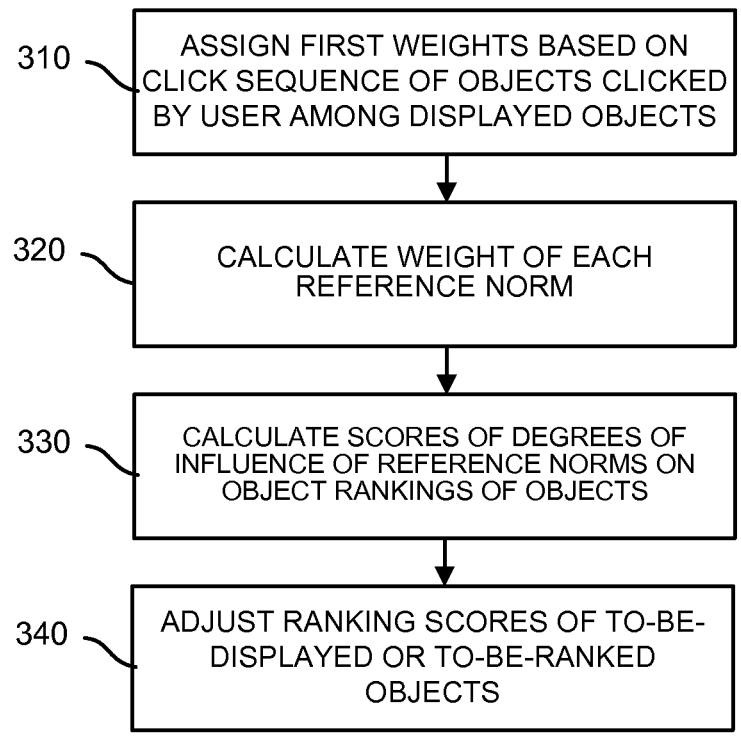
FIG. 3 is a flowchart of an embodiment of a ranking score calculation method.

FIG. 3 is a flowchart of an embodiment of a ranking score calculation method. In some embodiments, the method 300 is an implementation of 140 and comprises:

A selection sequence of the user regarding the displayed objects is the sequence in which the user clicks objects in the search results that is displayed.

In 310, the server assigns first weights based on the click sequence of objects clicked by the user among the displayed objects.

The closer to the end of the click sequence, the greater the value of a weight is to be assigned and thus the more a corresponding object conforms to the user's query intention. In other words, in product searches, the later a click is performed by the user, the more likely the click confirms to the user's intention. Thus, different first weights are assigned on clicked products in accordance with the click sequence.

For example, the position within the click sequence taken directly as a first weight. In the event that the product is the first one clicked, the first weight of the product is V1, the first weight of the second product that is clicked is V2, etc. The first weight of the nth product that is clicked is Vn. The first weight of each clicked product increases according to the sequence in which the products are clicked: V1<V2 . . . <Vn.

In 320, the server calculates weight of each reference norm based on the weights of those objects that are among objects selected by the user and that comply with the reference norms.

The quantity of user-selected objects (i.e., clicked objects) is n, and n is a natural number. The weights of effects of these user-selected objects on user query intention are the sequence V1, V2, . . . Vn. For a reference norm, the server calculates the sum of weights of selected objects that comply with the reference norm, and denotes the sum of the weights as Vm. In some embodiments, the server regards the ratio of the sum of weights of selected objects that comply with the reference norm to the total weight of objects selected by the user as the reference norm weight. In other words, the reference norm weight corresponds to the weight for the effect of the reference norm on user query intention. The server denotes the reference norm weight as Q. In other words, Q corresponds to Vm/(V1+V2+. . . Vn).

For example, in the case of first-page search results whose query word is "Nike," the user clicks the 1st, 3rd, 5th, and 15th products. The record corresponds to (20120324081, Nike, 1, auction_1:auction_3:auction_5:auction_15). The first weights corresponding to the 1st, 3rd, 5th, and 15th products are 1, 2, 3 and 4, respectively. A reference norm determined based on the user's actions includes an attribute of a product-related tag and an attribute value "Triple refund for one fake" which corresponds to the product-related tag. In the list of search results, the 1st, 5th, and 15th products have the product-related tag of the attribute, and the product-related tag has the attribute value of "Triple refund for one fake." In other words, the 1st, 5th, and 15th products comply with the reference norm. Thus, the weight of the reference norm is $(1+3+4)/(1+2+3+4)=0.8$.

In some embodiments, as for calculating graphic characteristics, offline conversion of product pictures into graphic characteristic values is performed to represent pictures in numerical form. Closer numerical values indicate more similar pictures.

In 330, the server calculates comprehensive score of degrees of influence of the reference norms on object rankings of the objects that are to be displayed or to be ranked that comply with the reference norms.

In some embodiments, some objects to be ranked comply with a plurality of reference norms. In some embodiments, a norm score is pre-allocated to each reference norm. Norm scores for reference norms determined according to the selected set is a positive value, for example, the score "1." Norm scores for reference norms determined according to the unselected set is a negative value, for example, the score "−1." The comprehensive score of the degree of influence of the reference norms on the ranking of the objects to be ranked that comply with the reference norms is the sum of the products of the reference score and the weight of each reference norm.

In some embodiments, the formula for calculating the comprehensive score of the degree of influence of reference norms on the ranking of the object (for example, recorded as "auction_id") to be ranked that conform to these same reference norms is:

$f(\mathrm{auction\_id})=T1*Q1+T2*Q2 \ldots +Tn*Qn$ f(auction_id) corresponds to a comprehensive score of a degree of influence of reference norms on the ranking of the object; Tn corresponds to the norm score for the nth reference norm; and Qn corresponds to the weight for the nth reference norm. A norm score of a reference norm determined according to the selected set is a fixed positive value. In some embodiments, as an aspect, individual norm scores are also different preset positive values. In some embodiments, the norm score for a reference norm determined based on the unselected set is a fixed negative value. As an aspect, individual norm scores are also different preset negative values.

The similarities between the pictures of products to be ranked and the clicked picture are calculated based on the graphic characteristic values, and a picture similarity threshold value is set. The server determines whether the calculated similarities are greater than the preset picture similarity threshold values, and the first N3 are selected (N3 being any integer). For example, in a case where each page displays 40 products, N3 is set at 40 so that the products with the 40 highest similarities between pictures of to-be-ranked products and the clicked picture are selected and stored as (auction_id, auc_list). "auc_list" corresponds to the list of products in order of greatest similarity to smallest similarity. The first product that appears on "auc_list" is the one product whose graphic characteristics are the most similar to the clicked product.

In the event that the user's click actions include a plurality of clicked products, a product list of to-be-ranked products is determined for each clicked product. In the event that a to-be-ranked product exists in a list of products, the server uses the similarity between the to-be-ranked product and the clicked product to weight f (auction_id). In the event that the product does not exist in the list of products, the server does not weight f (auction_id).

In 340, the server adjusts the ranking scores of to-be-displayed or to-be-ranked objects according to the comprehensive score of the degree of influence of the reference norms on the to-be-displayed or to-be-ranked objects that conform to the same reference norms.

In the event that f (auction_id) is a positive value, the ranking score on the to-be-displayed or to-be-ranked object is adjusted in a positive direction. In other words, the ranking of the object is raised.

In the event that f (auction_id) is a negative value, the ranking score to-be-displayed or to-be-ranked object is adjusted in a negative direction. In other words, the ranking of the object is lowered.

Referring back to FIG. 1, in 150, the server re-ranks the to-be-displayed or to-be-ranked objects based on the adjusted ranking scores for the to-be-displayed or to-be-ranked objects.

In the event that f (auction_id) is less than 0 or negative, then that means that the product rank is to be lowered, in which case f (auction_id) is added to the original ranking score of the product to produce the adjusted ranking score. In the event that f(auction_id) is greater than 0 or positive, then that means that the product rank is to be raised, in which case f (auction_id) is added to the original ranking score of the product to produce the adjusted ranking score.

In some embodiments, to-be-ranked products are dynamically adjusted according to the user's action characteristics. The search results on page n+1 are to be ranked according to the click feedback from the previous n pages.

In some embodiments, the server also records browsing actions or click feedback actions of the user during a period of time. The adjustments to ranked objects in the present search result may be at least in part based on the recorded browsing actions or click feedback actions of the user. Examples of the recorded browsing actions or click feedback actions include information about products the user browsed (for example, product prices), information about shops the user browsed, and information about categories the user browsed and information about products the user bookmarked. Historical preference statistics constitute a basis for extracting shared attribute characteristics for dynamically influencing ranking scores.

Figure 4A:
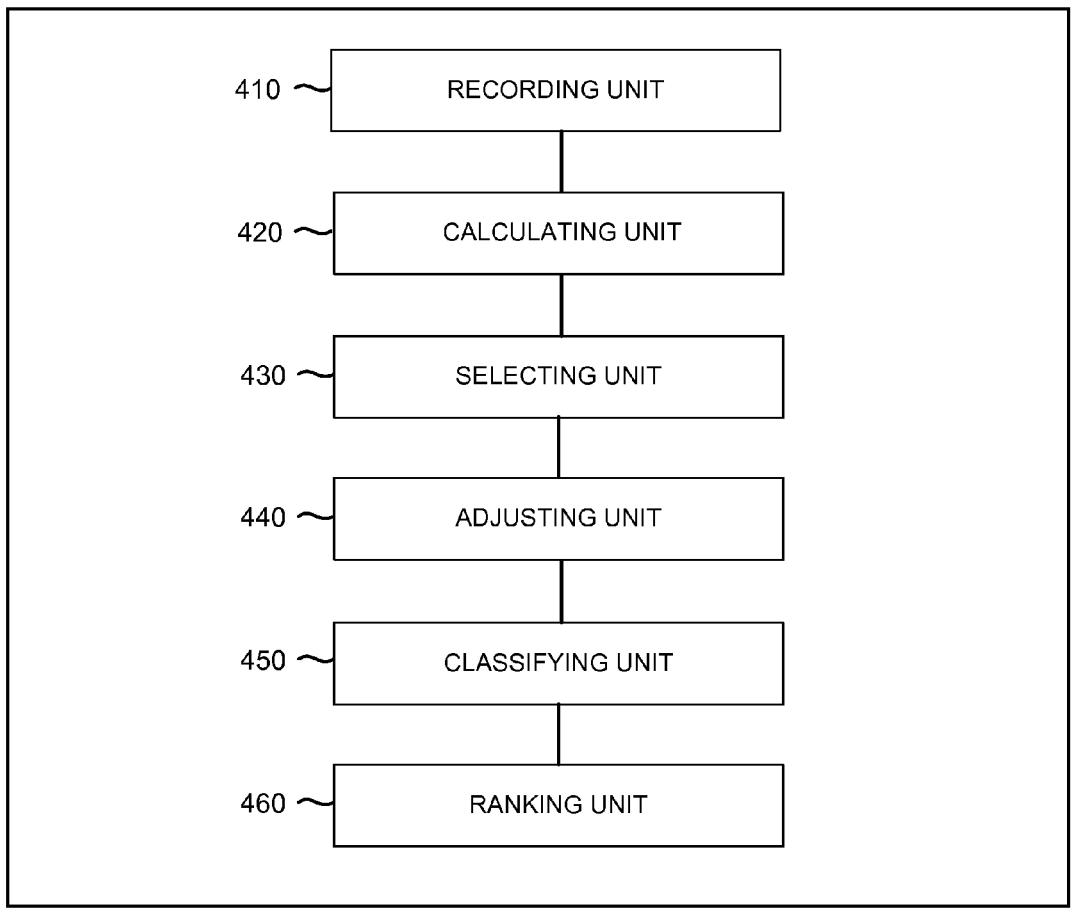
FIG. 4A is a diagram of an embodiment of a search result ranking system.

FIG. 4A is a diagram of an embodiment of a search result ranking system. The system 400 comprises: a recording unit 410, a calculating unit 420, a selecting unit 430, an adjusting unit 440, a classifying unit 450, and a ranking unit 460.

The recording unit 410 records user action information on displayed objects in search results obtained using query words.

After entering the query words through a browser and confirming the query words, a user sends a search request to a search engine of a system. After receiving the user's search request, the search engine performs words segmentation and other such operations on the query words and conducts a search to obtain corresponding search results. The browser displays the search results in page-by-page or screen-by-screen form according to the magnitude of the correlation. In some embodiments, an existing search engine is used to obtain the search results of the query words, which are displayed using a default ranking method. The system performs dynamic ranking on the foundation of the search results generated by the existing search engine.

In some embodiments, the objects are products or product information. During product searches, the search engine uses the query words to search databases to find products that are related to the query words. The found products are then ranked and displayed according to the magnitude of correlation between the query words and the products or product information. In some embodiments, other forms of product ranking are adopted. No restrictions are imposed to the specific display forms.

In some embodiments, user actions relating to objects in the search results include browsing and clicking. The recording unit 410 records action information on each object in the search results based on user browsing or clicking actions. In the event that a switch-page or switch-screen request is received for the same query word, the calculating unit 420 is triggered. The action information includes: objects of user action, information on the relative positions of user action objects in search results, the sequences in which the user browsed or clicked the behavior objects, or any combination thereof. As an example, an object within the search results is, in concrete terms, a product. Objects that have not been displayed in the search results are objects that are to be re-ranked and displayed.

The recording unit 410 records information on user-browsed pages based on user browsing action. Regardless of whether the page has generated click information, the page is to be recorded as long as the user has browsed the page. The recorded information, in other words, the user action information, further comprises page session information, the query words corresponding to the page, the page number or screen of the page within the search results, the product identification code (ID) corresponding to the page, the action sequence for the object of the current user action within the objects acted upon by the user, or any combination thereof.

A session refers to the process whereby the terminal user and the interactive system communicate. The session typically refers to the process beginning with the user registering to enter the system and ending with the user logging out and exiting the system.

In some embodiments, one session refers to in the event that a user is browsing a website, the operations while the user is using the browser during a period of time defined as beginning with entry into the website and ending with the closing of the browser constitute the operations of the same session.

In some embodiments, in the same session, the user enters one or more query words to conduct search queries. The recording unit 410 dynamically ranks search results from the same query word or query word combinations within the same session. The search results on page n+1 are ranked according to the browsing or clicking feedback from the previous n pages. For example, in satisfying actual use, the search results for the same query word in different sessions within a period of time are dynamically ranked for the same user or the same IP address.

Based on the same principle, the recording unit 410 records clicked products based user click actions. The user click actions are recorded together with the sequence in which products are clicked, i.e., the sequence of actions of the user vis-à-vis the objects. The action information recorded vis-à-vis the user-clicked objects includes page session information corresponding to the objects, query words corresponding to the objects, the page number or screen of the page where the objects are located among the search results, the product identification code (ID) of the objects, the sequence in which the objects were clicked among the objects subjected to user action, or any combination thereof. For example, the recorded format is "(session, query words, page number, product ID string, action sequence)" expressing information on the product IDs clicked on one page for a certain query word in one session. Statistics have revealed that, during a query search, the last click and not the first click by a user is closest to the user's intention. Typically, the closer a click is to the end of a click sequence, the greater is the value of the client and the better the click matches the user's query intention.

Regarding storage format, in some embodiments, the recording unit 410 writes clicked products in sequence into a product ID string and then compresses the clicked products with a fixed symbol. In some embodiments, a "storehouse" data structure is used, or other structures can be used as well.

As an example, assume that "Nike" is searched and on the first page, four products are clicked in sequence. In some embodiments, the number of products on a page is 40. For example, the recording result is:

(20120324081, nike, 1, auction_1:auction_3:auction_5:auction_15)

The first field of the record represents a session. For example, "20120324081" corresponds to the ID of the session. The second field corresponds to the query word, and the third field corresponds to the page. "auction_1," "auction_3," "auction_5," and "auction_15" each correspond to the ID of a different product. The records of the examples reveal the search results on the first page. The product with the product ID of "auction_15" corresponds to the fourth product clicked.

In the event that the recording unit 410 receives a switch-page or switch-screen request sent by the user in the same session with regard to the same query word, the recording unit 410 triggers the calculating unit 420.

The calculating unit 420 determines commonality levels of attribute characteristics in a set of objects subjected to user actions. In some embodiments, the determining of the commonality levels is based on user action information on the displayed objects.

In the event that the recording unit 410 is triggered, the calculating unit 420 acquires the user action information on the displayed objects in the search results corresponding to the query word used in the current session and determines the characteristic information on user actions based on the user action information.

The classifying unit 450 classifies clicked objects as a selected set, and classifies displayed objects that have not been clicked as an unselected set.

A user click can include one or more user actions. In some embodiments, a user click is included in the following user actions: the user selects an object among the search results, clicks the selected object, and goes to the detailed information page for the clicked object. In some embodiments, a user click is also included in the following user actions: the user selects an object among to search results such that detailed descriptive information relating to the object is displayed.

In the event that the user selects a list page of search results, the objects displayed on the list page are typically objects that the user can acquire or browse. After a user selects and obtains the list page, the objects displayed on the list page are regarded as objects already browsed by the user.

The browsed products (i.e., displayed objects) are divided into two sets: the selected set and the unselected set. The products in the selected set are products that have been browsed and clicked. The products in the unselected set are products that have been browsed but not clicked.

In some embodiments, the classifying unit 450 is limited to taking the clicked objects from among the search results and classifying the clicked objects within the selected set. In some embodiments, the classifying unit 450 is limited to taking displayed but not yet clicked objects from among the search results and classifying the not yet clicked objects with the unselected set.

Figure 4B:
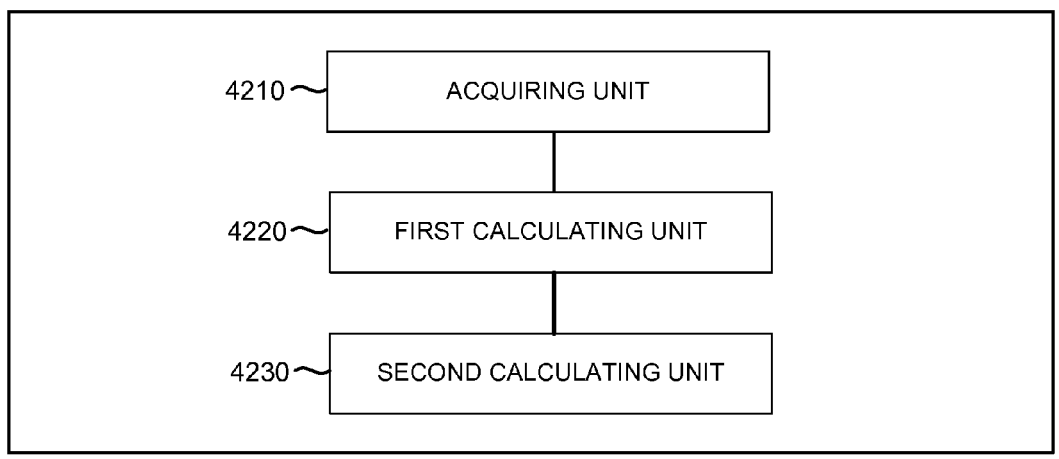
FIG. 4B is a diagram of an embodiment of a calculating unit.

FIG. 4B is a diagram of an embodiment of a calculating unit. In some embodiments, the calculating unit 420 comprises an acquiring unit 4210, a first calculating unit 4220, and a second calculating unit 4230.

The acquiring unit 4210 acquires the attribute characteristics of the displayed objects.

The product IDs corresponding to user action objects are isolated in order of the relational sequence in the historical selection information, and attribute characteristics corresponding to the product IDs are acquired. The attribute characteristics include one or more of the following pieces of information: the title of the product information, the price of the product, picture or picture addresses of the product, the number of recent transactions, shipping costs, area where the product is located, seller's name, and self-defined tags (for example, service tags provided by the product publisher, including: "Triple refund for one fake," "As described," "Goods refunded or replaced within 7 days, no explanation required," "Shipped with lightning speed," "Detailed drawings," "Payment upon delivery," "Consumer safeguards," and other product or seller tags). In some embodiments, because the attribute characteristics of the products typically are displayed on search result list pages, affecting, through direct, intuitive appeal, the buyer's action tendencies vis-à-vis the search results are possible. Therefore, the product attribute characteristics can be used to identify user intentions. The attribute characteristics include attribute values or attribute value intervals of attributes and of products in relation to the attributes.

The first calculating unit 4220 calculates the commonality levels of the attribute characteristics in the selected set based on the recorded user action information on the displayed objects.

The second calculating unit 4230 calculates the commonality levels of the attribute characteristics in the unselected set based on each attribute characteristic possessed by objects in the unselected set.

The commonality level of an attribute characteristic in the selected set or the unselected set is: the ratio of the number of objects having the same or similar of the attribute characteristic to the total number of objects in the selected set or the unselected set. In other words, the commonality level of an attribute characteristic corresponds to the ratio of number of the products that have the same or similar attribute values of the attribute characteristic to the total number of objects in the selected set or the unselected set.

Examples where the attribute values of the attributes are similar include: the attribute values of the attributes of a plurality of objects are within the same preset interval.

Pictures are one of many factors that influence clicking and yet having a similar commonality level for each picture of a similar product is very difficult or unlikely. Therefore, the attribute characteristics are divided into graphic attribute characteristics and non-graphic attribute characteristics. In some embodiments, the attribute values of picture attributes are expressed using product picture characteristic values.

To calculate commonality levels of the non-graphic attribute characteristics, the attribute values of the non-graphic attribute characteristics of the products are digitized or split into groups and discretized. For example, a statistical method is used to group price, number of transactions, credit, and other attributes according to certain rules. For example, the price attribute is divided into the three attribute value ranges of (0, 50], (50, 100] and (100-150], and the attribute value of the price attribute of each product is allocated to the appropriate range of the attribute. By digitizing or grouping each attribute of the products, each attribute becomes possible to group and discretize the attribute characteristics. In the event that the majority of clicked products fall into the same attribute value range for a certain attribute, then the attribute characteristic including this attribute and the attribute value has a higher commonality level among the clicked products.

The selecting unit 430 selects attribute characteristics that comply with pre-established requirements to serve as reference norms for ranking objects that are to be displayed or ranked. In some embodiments, the selecting of the attribute characteristics is based on the commonality levels.

In some embodiments, the selecting of the attribute characteristics that comply with the pre-established requirements to serve as reference norms for ranking objects that are to be displayed or ranked (i.e., undisplayed objects) includes one or more of the following approaches:

In a first approach, the selecting unit 430 ranks the various attribute characteristics in order of highest to lowest commonality level, and selects a pre-established quantity of top-ranked attribute characteristics to serve as reference norms.

In a second approach, the selecting unit 430 selects attribute characteristics whose commonality level is greater than a preset threshold value as reference norms.

In a third approach, the selecting unit 430 first calculates the differences between commonality levels of each attribute characteristics in the select set and the unselected set, and regards the attribute characteristics corresponding to the differences in commonality levels that are greater than a predetermined threshold value as reference norms.

In a fourth approach, the selecting unit 430 first calculates the differences between commonality levels of each attribute characteristic in said selected set and said unselected set, rank said attribute characteristics from high to low according to said differences in commonality levels, and select a preset quantity of top-ranked attribute characteristics as reference norms.

If attribute characteristics have higher commonality levels in the selected set, i.e., the attribute characteristics in the set of products clicked by the user have high commonality levels, that means that the attribute characteristics are possibly reference factors in the user's choice of products. At the same time, the lower the commonality level of the attribute characteristics in the unselected set, the greater the difference in commonality levels of these attribute characteristics in the selected set and the unselected set. That would indicate a higher probability that the attribute characteristics influenced the product selection of the user, in which case the attribute characteristics can be regarded as reference norms for dynamic ranking of the products on un-displayed pages. In some embodiments, the reference norms are used to differentiate user intentions.

In some embodiments, the dynamic ranking takes the differences in commonality levels of attribute characteristics in the selected set and the unselected set into comprehensive consideration and selects as reference norms those attribute characteristics that have high commonality levels in the selected set but that either do not exist in the unselected set or have low commonality levels the unselected set.

In some embodiments, the calculating unit 420 does not utilize the classifying unit 450. In some embodiments, the unselected set is not considered when relatively few user clicks exist, for example, when just one or two products have been clicked. Accordingly, the first calculating unit 4220 performs calculations. The commonality level of each attribute characteristic is calculated based on the attribute characteristics possessed by the selected objects or of the attribute characteristic values that correspond to the selected objects. The selecting unit 430 regards attribute characteristics whose commonality levels meet requirements as key characteristics.

The ranking unit 460 calculates a ranking score for each object to be displayed or to be ranked based on a corresponding reference norm.

The selecting unit 430 determines reference norms based on the commonality levels. For example, the set of reference norms determined according to the commonality level of each attribute characteristic in the selected set is expressed as (A1,A2,A3). The set of reference norms determined according to the commonality level of each attribute characteristic in the unselected set are expressed as (B1,B2,B3).

The ranking unit 460 performs ranking score adjustments for objects that are to be ranked based on the reference norms. In some embodiments, the ranking unit 460 increases the score of objects that comply with the reference norms A1,A2,A3, or any combination thereof, and decreases the score of objects that comply with the reference norms B1,B2,B3, or any combination thereof. In other words, the ranking unit 460 increases the ranking scores of, or gives positive ranking scores to, objects that have not been displayed or are to be ranked and which comply with the reference norms determined from the selected set. The ranking unit 460 decreases the ranking scores of, or gives negative ranking scores to, objects that have not been displayed or are to be ranked and which comply with the reference norms determined from the unselected set.

In some embodiments, the ranking unit 460, in calculating the ranking score of each object that is to be displayed or ranked, takes into account a ranking score of each object obtained by natural ranking rules. In other words, the ranking score that is obtained in accordance with the natural ranking rules is increased or decreased according to the reference norms. The natural ranking rules are ranking rules used when the first page or the first screen of the search results is displayed.

In the event that the ranking unit 460 calculates the ranking score of each object that has not been displayed or that is to be ranked in order to ensure preferential display of objects that comply with reference norms determined from the selected set, the ranking score of objects that have not been displayed or that are to be ranked and that comply with reference norms determined from the selected set are scores which were originally the maximum ranking scores of not-yet-displayed or to-be-ranked objects that were obtained in accordance with natural ranking rules and which were then boosted.

Figure 4C:
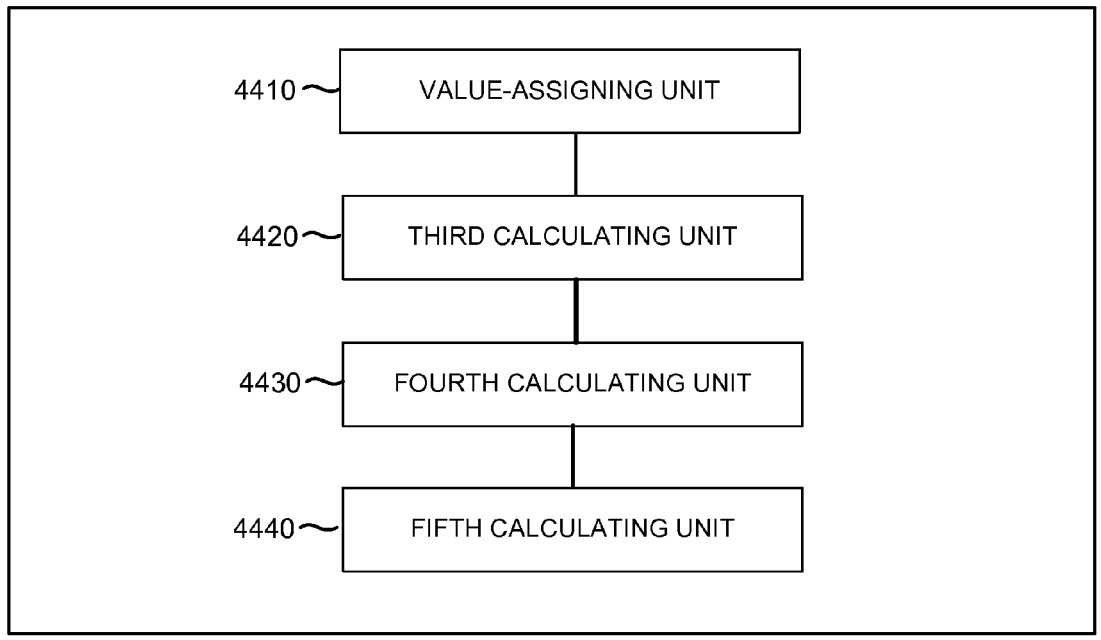
FIG. 4C is a diagram of an embodiment of an adjusting unit.

FIG. 4C is a diagram of an embodiment of an adjusting unit. In some embodiments, the adjusting unit 440 comprises a value-assigning unit 4410, a third calculating unit 4420, a fourth calculating unit 4430, and a fifth calculating unit 4440.

In some embodiments, the selection sequence of the user with regard to the displayed objects is the sequence in which the user clicks objects in the search result list that is displayed.

The value-assigning unit 4410 assigns first weights based on the sequence in which displayed objects are clicked by the user.

The closer to the end of the click sequence, the greater the value of the weight of the clicked object is going to be and thus the more the weight of the clicked object to better conform to the user's query intentions. Thus, different first weights are assigned on clicked products in accordance with the click sequence. For example, the position within the click sequence is taken directly as a first weight. In the event that the product is the first product clicked, the first weight of the product is V1. The first weight of the second product that is clicked is V2, etc. The first weight of the nth product that is clicked is Vn. The first weight of each clicked product increases according to the sequence in which the products are clicked: V1<V2...<Vn.

The third calculating unit 4420 calculates the weight of each reference norm based on the first weights of those objects among objects selected by the user that comply with the reference norms.

The quantity of user-selected objects (i.e., clicked objects) is n, and n is a natural number. The weights of the effects of these user-selected objects on user query intention are the sequence V1,V2, . . . Vn. For a reference norm, the third calculating unit 4420 calculates the sum of the weights of the selected objects that comply with the reference norm, and denotes the sum of weights as Vm. In some embodiments, the third calculating unit 4420 regards the ratio of the sum of weights of selected objects that comply with the reference norm to the total weight of objects selected by the user as the reference norm weight, i.e., the weight for the effect of the reference norm on user query intention and denotes the reference norm weight as Q. In other words, Q=Vm/(V1+V2+ . . . Vn).

For example, in the case of first-page search results whose query word is "Nike," the user clicks the 1st, 3rd, 5th, and 15th products. The record is (20120324081, Nike, 1, auction_1:auction_3:auction_5:auction_15). The first weights corresponding to the 1st, 3rd, 5th, and 15th products are 1, 2, 3 and 4, respectively. The third calculating unit 4420 determines a reference norm. The reference norm based on the user's actions includes the attribute of the product-related tag and the attribute value "Triple refund for one fake," which corresponds to the product-related tag. In the list of search results, the 1st, 5th, and 15th products have the product-related tag attribute, and the product-related tag has the attribute value of "Triple refund for one fake." In other words, the product-related tag attribute and the attribute value of the product-related tag attribute comply with the reference norm. Thus, the weight of the reference norm is (1+3+4)/(1+2+3+4)=0.8.

For calculating graphic characteristics, the third calculating unit 4420 performs an offline conversion of product pictures into picture characteristic values to represent the pictures in a numerical form. Closer numerical picture characteristic values indicate more similar pictures.

The fourth calculating unit 4430 calculates a comprehensive score of a degree of influence of the reference norms on the object rankings based on the reference norm weights with which the attribute characteristics of the objects that are to be displayed or to be ranked comply.

In some embodiments, objects to be ranked comply with a plurality of reference norms. A norm score is pre-allocated to each reference norm. The norm score for reference norms determined according to the selected set is a positive value, for example, the score "1." The norm score for reference norms determined according to the unselected set is a negative value, for example, the score "−1." The comprehensive score of the degree of influence of the reference norms on the ranking of the to-be-ranked objects that comply with the reference norms is the sum of the products of the reference score and weight of each reference norm.

In some embodiments, a formula used for calculating the comprehensive score of the degree of influence of reference norms on the ranking of objects that conform to these same reference norms is:

$$f(\text{auction\_id})=T1*Q1+T2*Q2 \ldots +Tn*Qn$$

f(auction_id) corresponds to the comprehensive score of the degree of influence of a reference norm on the ranking of objects that conform to this same reference norm. Tn corresponds to the norm score for the nth reference norm. Qn corresponds to the weight for the nth reference norm. The norm score of the reference norms determined according to the selected set is a fixed positive value. As an aspect, individual norm scores also are different preset values. The norm score for the reference norms determined according to the unselected set is a fixed negative value. As an aspect, individual norm scores are also different preset negative values.

The fourth calculating unit 4430 calculates the similarities between the pictures of products to be ranked and the clicked picture according to the picture characteristic values, and sets picture similarity threshold values. The fourth calculating unit 4430 determines whether the similarities are greater than the preset picture similarity threshold values based on the calculated similarities and selects the first N3 (N3 being any integer). For example, in a case where each page displays 40 products, N3 is set to 40 so that the products with the 40 highest similarities between the pictures of to-be-ranked products and the clicked pictures are selected and stored as (auction_id, auc_list). "auc_list" is the list of products in order of greatest similarity to smallest similarity. The first product that appears on "auc_list" is the one whose graphic characteristic is the most similar to the clicked product.

In the event that the user's click actions include a plurality of clicked products, the fourth calculating unit 4430 determines a product list of to-be-ranked products for each clicked product. In the event that a to-be-clicked product exists in a list of products, the fourth calculating unit 4430 uses the similarity between the to-be-ranked product and the clicked product to weight f (auction_id). In the event that the to-be-clicked product does not exist in the list of products, then the fourth calculating unit 4430 does not weight f (auction_id).

The fifth calculating unit 4440 adjusts the ranking scores of the objects based on the comprehensive score.

In some embodiments, the fifth calculating unit 4440 adjusts the ranking scores of to-be-displayed or to-be-ranked objects according to the comprehensive score of the degree of influence of the reference norms on the to-be-displayed or to-be-ranked objects that conform to the same reference norms.

In the event that f (auction_id) is a positive value, the ranking score of reference norm to-be-displayed or to-be-ranked objects is adjusted in a positive direction. In other words, the object ranking is raised.

In the event that f (auction_id) is a negative value, the ranking score of reference norm to-be-displayed or to-be-ranked objects is adjusted in a negative direction. In other words, the object ranking is lowered.

The ranking unit 460 re-ranks the to-be-displayed or to-be-ranked objects according to the adjusted ranking scores for the to-be-displayed or to-be-ranked objects.

In the event that f (auction_id) less than 0, then that means that the product rank is to be lowered, in which case f (auction_id) is added to the original ranking score of the product to produce the adjusted ranking score. In the event that f(auction_id) greater than 0, then that means that the product rank is to be raised, in which case f (auction_id) is added to the original ranking score of the product to produce the adjusted ranking score.

In this example, the to-be-ranked products are dynamically adjusted according to the user's action characteristics. The search results on page n+1 are to be ranked according to the click feedback from the previous n pages.

Figure 5:
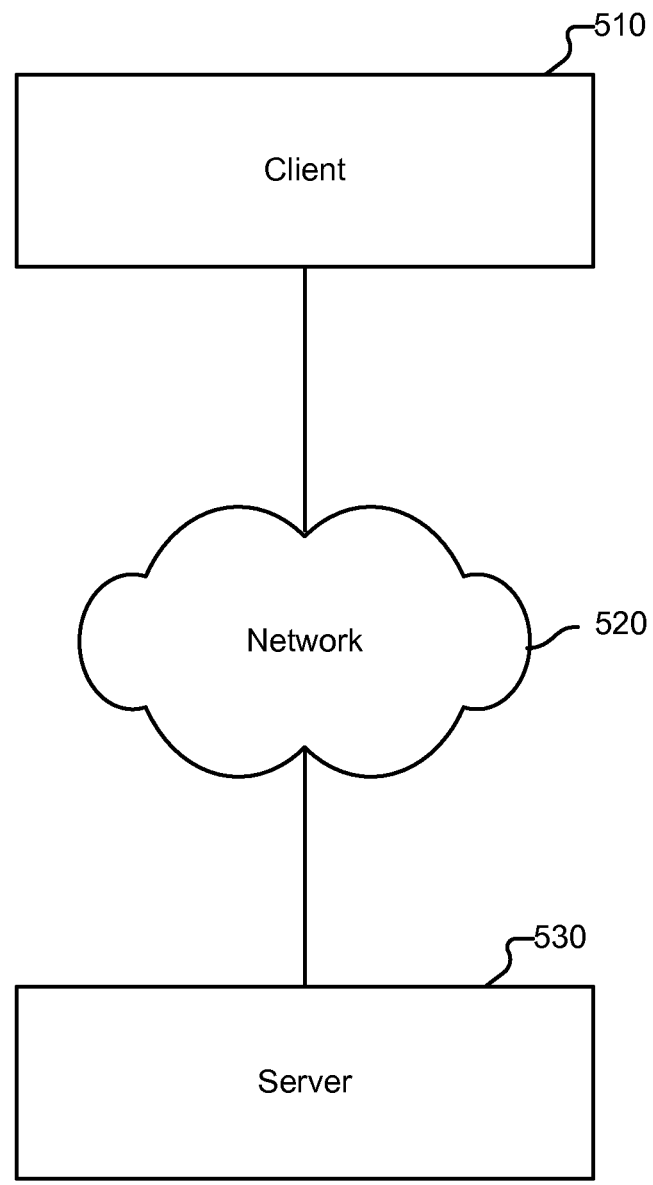
FIG. 5 is a structural diagram of an embodiment of a search result ranking system.

In some embodiments, while making adjustments to ranking scores, the system adds the browsing actions or click feedback actions of the user during a period of time. Examples the browsing actions or click feedback actions include which products, which retail shops, and which categories the user browsed and which products the user bookmarked. The system extracts shared attribute characteristics for dynamically influencing ranking scores based on historical preference statistics. FIG. 5 is a structural diagram of an embodiment of a search result ranking system. The system 500 includes a client 510 that communicates with a server 530 via a network 520.

After entering a query into a search engine via the client 510, the client sends the query to the server 530 via the network 520.

The ranking method and device provided dynamically updates search rankings on subsequent pages based on comprehensively-ranked, prior click feedback actions. The ranking method and device optimizes the rankings of query word search results and satisfies users in rapidly finding content to increase user browsing-to-transaction conversion rates.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A search result ranking method, comprising:
recording user action information on displayed objects in search results obtained using one or more query words, wherein the displayed objects relate to products or product information;
upon receiving a switch-page request or switch-screen request, determining two or more commonality levels of one or more attribute characteristics in objects subjected to user actions, wherein the determining of the two or more commonality levels is based on the user action information on the displayed objects, wherein the one or more attribute characteristics include: title of a product, price of a product, image or image address of a product, number of recent transactions of a product, shipping costs of a product, area where product is located, seller's name of a product, self-defined tags provided by a product publisher, service tags provided by a product publisher, or any combination thereof, and wherein the determining of the two or more commonality levels comprises:
calculating first commonality levels of attribute characteristics of objects in a selected set based on the recorded user action information on the displayed objects, wherein the selected set includes user-selected objects of the displayed objects, a first commonality level corresponding to a ratio of a number of objects having the same or similar attribute characteristic of the user-selected objects and a total number of the user-selected objects; and
calculating second commonality levels of attribute characteristics of objects in an unselected set, wherein the unselected set includes displayed objects that have not been selected, a second commonality level corresponding to a ratio of a number of objects having the same or similar attribute characteristic of the displayed objects that have not been selected and a total number of the displayed objects that have not been selected;

selecting attribute characteristics that comply with predetermined requirements to serve as reference norms for ranking objects that are to be displayed or ranked, wherein the selecting of the attribute characteristics is based on the first commonality level of the calculated first commonality levels and the second commonality level of the calculated second commonality levels; and adjusting rank of objects that are to be displayed or to be ranked, and whose attribute characteristics comply with the reference norms, wherein the objects that are to be displayed or to be ranked have not yet been displayed and are on a separate page from the displayed objects.

2. The search result ranking method as described in claim 1, wherein the action information includes objects of user action, information on relative positions of user action objects in the search results, sequences in which a user browsed or selected the action objects, or any combination thereof.

3. The search result ranking method as described in claim 1, wherein the selecting of the attribute characteristics that comply with the predetermined requirements to serve as the reference norms for ranking objects that are to be displayed or ranked based on the first commonality level of the calculated first commonality levels and the second commonality level of the calculated second commonality levels comprises:

ranking various attribute characteristics in the selected set and the unselected set in order of high to low commonality level, and selecting a predetermined quantity of top-ranked attribute characteristics to serve as reference norms; or regarding attribute characteristics with commonality levels greater than a threshold value as the reference norms.

4. The search result ranking method as described in claim 1, wherein the selecting of the attribute characteristics that comply with the predetermined requirements to serve as the reference norms for ranking objects that are to be displayed or ranked based on the first commonality level of the calculated first commonality levels and the second commonality level of the calculated second commonality levels comprises:

calculating differences in commonality levels between various attribute characteristics in the selected set and the unselected set, ranking the various attribute characteristics in an order of large to small differences in the two or more commonality levels between various attribute characteristics in the selected set and the unselected set, and selecting a predetermined quantity of top-ranked attribute characteristics to serve as the reference norms; or regarding attribute characteristics whose the difference in a corresponding commonality level is greater than a set threshold value as the reference norms.

5. The search result ranking method as described in claim 1, wherein the objects subjected to user actions are objects that were selected from among the search results.

6. The search result ranking method as described in claim 5, further comprising:

classifying objects selected from among the search results with the selected set, wherein the adjusting of the rank of objects that are to be displayed or to be ranked, and whose attribute characteristics comply with the reference norms comprises:

calculating a commonality level of each attribute characteristic in the selected set based on the user action information on objects in the selected set;

selecting attribute characteristics whose first or second commonality level is greater than a preset threshold value as reference norms; and raising the rank of objects that are to be displayed or to be ranked and whose attribute characteristics comply with the reference norms.

7. The search result ranking method as described in claim 5, further comprising:

classifying objects selected from among the search results with the selected set, wherein the adjusting of the rank of objects that are to be displayed or to be ranked and whose attribute characteristics comply with the reference norms comprises:

calculating a commonality level of each attribute characteristic in the selected set based on the user action information on the objects in the selected set;

ranking various attribute characteristics in the selected set and unselected set in order of highest to lowest commonality level;

selecting a pre-established quantity of top-ranked attribute characteristics to serve as reference norms; and raising the rank of objects that are to be displayed or to be ranked and whose attribute characteristics comply with the reference norms.

8. The search result ranking method as described in claim 1, further comprising:

classifying objects that were displayed among the search results but not yet selected with unselected set, wherein the adjusting of the rank of objects that are to be displayed or to be ranked and whose attribute characteristics comply with the reference norms comprises:

calculating a commonality level of each attribute characteristic in the unselected set;

selecting attribute characteristics whose commonality level is greater than a preset threshold value as reference norms; and lowering the rank of objects that are to be displayed or to be ranked and whose attribute characteristics comply with the reference norms.

9. The search result ranking method as described in claim 1, further comprising:

classifying objects that were displayed among the search results but not yet selected with the unselected set, wherein the adjusting of the rank of objects that are to be displayed or to be ranked and whose attribute characteristics comply with the reference norms comprises:

calculating a commonality level of each attribute characteristic in the unselected set based on the user action information on the objects in the unselected set;

ranking various attribute characteristics in the selected set and the unselected set in order of highest to lowest commonality level;

selecting a pre-established quantity of top-ranked attribute characteristics to serve as the reference norms; and lowering the rank of objects that are to be displayed or to be ranked and whose attribute characteristics comply with the reference norms.

10. The search result ranking method as described in claim 1, further comprising:
calculating a ranking score for each object that is to be displayed or to be ranked based on a corresponding reference norm; and
wherein the adjusting of the ranks of objects that are to be displayed or to be ranked, and whose attribute characteristics comply with the reference norms comprises re-ranking objects that are to be displayed or to be ranked according to the ranking scores,
wherein the calculating of the ranking score for each object that is to be displayed or to be ranked based on the corresponding reference norm comprises:
assigning first weights according to a sequence in which displayed objects are selected by the user;
calculating a weight of each reference norm based on the first weights of those objects that are among objects selected by the user and that comply with the reference norms;
calculating comprehensive scores of degrees of influence of the reference norms on the object rankings based on the weights of the reference norms with which the attribute characteristics of the objects that are to be displayed or to be ranked comply; and
adjusting the ranking scores of the objects according to the comprehensive scores.

11. A search result ranking device, comprising:
at least one processor configured to:
record user action information on displayed objects in search results obtained using one or more query words, wherein the displayed objects relate to products or product information;
upon receiving a switch-page request or switch-screen request, determine two or more commonality levels of one or more attribute characteristics in objects subjected to user actions, wherein the determining of the two or more commonality levels is based on the user action information on the displayed objects, wherein the one or more attribute characteristics include: title of a product, price of a product, image or image address of a product, number of recent transactions of a product, shipping costs of a product, area where product is located, seller's name of a product, self-defined tags provided by a product publisher, service tags provided by a product publisher, or any combination thereof, and wherein the determining of the two or more commonality levels comprises to:
calculate first commonality levels of attribute characteristics of objects in a selected set based on the recorded user action information on the displayed objects, wherein the selected set includes user-selected objects of the displayed objects, a first commonality level corresponding to a ratio of a number of objects having the same or similar attribute characteristic of the user-selected objects and a total number of the user-selected objects; and
calculate second commonality levels of attribute characteristics of objects in an unselected set, wherein the unselected set includes displayed objects that have not been selected, a second commonality level corresponding to a ratio of a number of objects having the same or similar attribute characteristic of the displayed objects that have not been selected and a total number of the displayed objects that have not been selected;
select attribute characteristics that comply with predetermined requirements to serve as reference norms for ranking objects that are to be displayed or ranked, wherein the selecting of the attribute characteristics is based on the first commonality level of the calculated first commonality levels and the second commonality level of the calculated second commonality levels; and
adjust rank of objects that are to be displayed or to be ranked and whose attribute characteristics comply with the reference norms, wherein the objects that are to be displayed or to be ranked have not yet been displayed and are on a separate page from the displayed objects; and
at least one memory coupled to the at least one processor and configured to provide the at least one processor with instructions.

12. The search result ranking device as described in claim 11, wherein the action information includes objects of user action, information on the relative positions of user action objects in the search results, sequences in which the user browsed or selected the action objects, or any combination thereof.

13. The search result ranking device as described in claim 11, wherein the selecting of the attribute characteristics that comply with predetermined requirements to serve as the reference norms for ranking objects that are to be displayed or ranked based on the first commonality level of the calculated first commonality levels and the second commonality level of the calculated second commonality levels comprises:
rank various attribute characteristics in the selected set and the unselected set in order of high to low commonality level, and select a predetermined quantity of top-ranked attribute characteristics to serve as the reference norms; or
regard attribute characteristics with commonality levels greater than a threshold value as the reference norms.

14. The search result ranking device as described in claim 11, wherein the selecting of the attribute characteristics that comply with the predetermined requirements to serve as the reference norms for ranking objects that are to be displayed or ranked based on the first commonality level of the calculated first commonality levels and the second commonality level of the calculated second commonality levels comprises:
calculate differences in commonality levels between various attribute characteristics in the selected set and the unselected set, rank the various attribute characteristics in an order of large to differences in the two or more commonality levels between various attribute characteristics in the selected set and the unselected set, and select a predetermined quantity of top-ranked attribute characteristics to serve as the reference norms; or
regard attribute characteristics whose the difference in a corresponding commonality level is greater than a set threshold value as the reference norms.

15. The search result ranking device as described in claim 11, wherein the objects subjected to user actions are objects that were selected from among the search results.

16. The search result ranking device as described in claim 15, wherein the at least one processor is further configured to:
classify objects selected from among the search results with the selected set, wherein the adjusting of the rank of objects that are to be displayed or to be ranked, and whose attribute characteristics comply with the reference norms comprises:
calculate a commonality level of each attribute characteristic in the selected set based on the user action information on objects in the selected set;
select attribute characteristics whose first or second commonality level is greater than a preset threshold value as reference norms; and
raise the rank of objects that are to be displayed or to be ranked and whose attribute characteristics comply with the reference norms.

17. The search result ranking device as described in claim 15, wherein the at least one processor is further configured to:
classify objects selected from among the search results with the selected set,
wherein the adjusting of the rank of objects that are to be displayed or to be ranked and whose attribute characteristics comply with the reference norms comprises:
calculate a commonality level of each attribute characteristic in the selected set based on the user action information on the objects in the selected set;
rank various attribute characteristics in the selected set and unselected set in order of highest to lowest commonality level;
select a pre-established quantity of top-ranked attribute characteristics to serve as reference norms; and
raise the rank of objects that are to be displayed or to be ranked and whose attribute characteristics comply with the reference norms.

18. The search result ranking device as described in claim 11, wherein the at least one processor is further configured to:
classify objects that were displayed among the search results but not yet selected with unselected set,
wherein the adjusting of the rank of objects that are to be displayed or to be ranked and whose attribute characteristics comply with the reference norms comprises:
calculate a commonality level of each attribute characteristic in the unselected set;
select attribute characteristics whose commonality level is greater than a preset threshold value as reference norms; and
lower the rank of objects that are to be displayed or to be ranked and whose attribute characteristics comply with the reference norms.

19. The search result ranking device as described in claim 11, wherein the at least one processor is further configured to:
classify objects that were displayed among the search results but not yet selected with the unselected set,
wherein the adjusting of the rank of objects that are to be displayed or to be ranked and whose attribute characteristics comply with the reference norms comprises:
calculate a commonality level of each attribute characteristic in the unselected set based on the user action information on the objects in the unselected set;
rank various attribute characteristics in the selected set and the unselected set in order of highest to lowest commonality level;
select a pre-established quantity of top-ranked attribute characteristics to serve as the reference norms; and
lower the rank of objects that are to be displayed or to be ranked and whose attribute characteristics comply with the reference norms.

20. The search result ranking device as described in claim 11, wherein the at least one processor is further configured to:
calculate a ranking score for each object that is to be displayed or to be ranked based on a corresponding reference norm; and
wherein the adjusting of the ranks of objects that are to be displayed or to be ranked and whose attribute characteristics comply with the reference norms comprises re-ranking objects that are to be displayed or to be ranked according to the ranking scores,
wherein the calculating of the ranking score for each object that is to be displayed or to be ranked based on the corresponding reference norm comprises:
assign first weights according to a sequence in which displayed objects are selected by the user;
calculate a weight of each reference norm based on the first weights of those objects that are among objects selected by the user and that comply with the reference norms;
calculate a comprehensive score of a degree of influence of the reference norms on the object rankings based on the weights of the reference norms with which the attribute characteristics of the objects that are to be displayed or to be ranked comply; and
adjust the ranking scores of the objects according to the comprehensive scores.

21. A computer program product for search result ranking, the computer program product being embodied in a tangible non-transitory computer readable storage medium and comprising computer instructions for:
recording user action information on displayed objects in search results obtained using one or more query words, wherein the displayed objects relate to products or product information;
upon receiving a switch-page request or switch-screen request, determining two or more commonality levels of one or more attribute characteristics in objects subjected to user actions, wherein the determining of the two or more commonality levels is based on the user action information on the displayed objects, wherein the one or more attribute characteristics include: title of a product, price of a product, image or image address of a product, number of recent transactions of a product, shipping costs of a product, area where product is located, seller's name of a product, self-defined tags provided by a product publisher, service tags provided by a product publisher, or any combination thereof, and wherein the determining of the two or more commonality levels comprises:
calculating first commonality levels of attribute characteristics of objects in a selected set based on the recorded user action information on the displayed objects, wherein the selected set includes user-selected objects of the displayed objects, a first commonality level corresponding to a ratio of a number of objects having the same or similar attribute characteristic of the user-selected objects and a total number of the user-selected objects; and
calculating second commonality levels of attribute characteristics of objects in an unselected set, wherein the unselected set includes displayed objects that have not been selected, a second commonality level corresponding to a ratio of a number of objects having the same or similar attribute characteristic of the displayed objects that have not been selected and a total number of the displayed objects that have not been selected;

selecting attribute characteristics that comply with predetermined requirements to serve as reference norms for ranking objects that are to be displayed or ranked, wherein the selecting of the attribute characteristics is based on the first commonality level of the calculated first commonality levels and the second commonality level of the calculated second commonality levels; and adjusting rank of objects that are to be displayed or to be ranked and whose attribute characteristics comply with the reference norms, wherein the objects that are to be displayed or to be ranked have not yet been displayed and are on a separate page from the displayed objects.

* * * * *